United States Patent
Silver

(10) Patent No.: US 10,564,428 B2
(45) Date of Patent: Feb. 18, 2020

(54) NEAR EYE DISPLAY

(71) Applicant: Joshua David Silver, Bicester (GB)

(72) Inventor: Joshua David Silver, Bicester (GB)

( * ) Notice: Subject to any disclaimer, the term of this patent is extended or adjusted under 35 U.S.C. 154(b) by 0 days.

(21) Appl. No.: 15/766,456

(22) PCT Filed: Oct. 6, 2016

(86) PCT No.: PCT/GB2016/053121
§ 371 (c)(1),
(2) Date: Apr. 6, 2018

(87) PCT Pub. No.: WO2017/060717
PCT Pub. Date: Apr. 13, 2017

(65) Prior Publication Data
US 2019/0086667 A1    Mar. 21, 2019

(30) Foreign Application Priority Data
Oct. 6, 2015   (GB) .................................. 1517607.6

(51) Int. Cl.
*G02B 27/01* (2006.01)
*G02B 3/14* (2006.01)
*G02B 6/122* (2006.01)
*G02B 27/09* (2006.01)

(52) U.S. Cl.
CPC ........... *G02B 27/0172* (2013.01); *G02B 3/14* (2013.01); *G02B 6/122* (2013.01); *G02B 27/0955* (2013.01)

(58) Field of Classification Search
None
See application file for complete search history.

(56) References Cited

U.S. PATENT DOCUMENTS

| 4,711,512 A | 12/1987 | Upatnieks |
| 8,774,884 B2 * | 7/2014 | Behrend ............... A61B 3/1233 600/310 |
| 8,885,997 B2 | 11/2014 | Nguyen et al. |
| 9,063,261 B2 * | 6/2015 | Katsuta ................. G02B 6/005 |

(Continued)

FOREIGN PATENT DOCUMENTS

| WO | 20111051660 A1 | 5/2011 |
| WO | 2014185049 A1 | 11/2014 |

*Primary Examiner* — Chad M Dicke
(74) *Attorney, Agent, or Firm* — Browdy and Neimark, PLLC

(57) ABSTRACT

A near eye display comprising: a display device; and a waveguide; wherein the waveguide comprises an entry diffractive element and an exit diffractive element; wherein the display device is arranged to direct light into the waveguide via the entry diffractive element and wherein the exit diffractive element is arranged to direct light from the waveguide towards a user's eye; wherein the display device is arranged to output images in a repeating sequence of two or more different colours. Providing the images are transmitted in sufficiently quick succession, the brain will not perceive them as separate images, but will instead essentially merge them (as if they were overlaid on top of one another. As the brain is good at pattern recognition, it can compensate for any minor misalignments that occur between the different images. In this way the time-multiplexing approach avoids the need for multiple parallel waveguides for each specific colour or colour band.

9 Claims, 3 Drawing Sheets

(56) References Cited

U.S. PATENT DOCUMENTS

Figure 1:
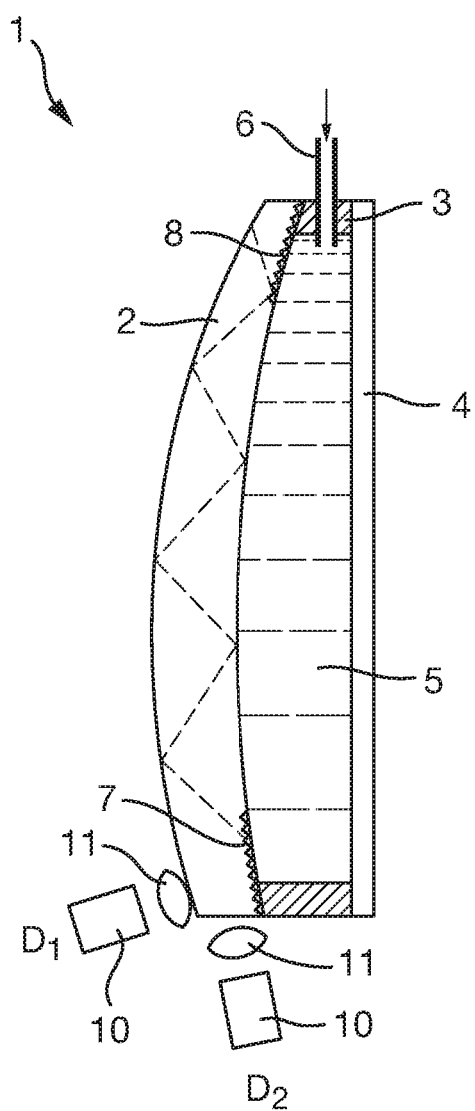

| | | | |
|---|---|---|---|
| 10,018,846 B2 * | 7/2018 | MacHida | G02B 26/0833 |
| 2006/0228073 A1 * | 10/2006 | Mukawa | G02B 6/0026 |
| | | | 385/31 |
| 2007/0070859 A1 * | 3/2007 | Hirayama | G02B 5/32 |
| | | | 369/112.04 |
| 2007/0091445 A1 * | 4/2007 | Amitai | G02B 6/0056 |
| | | | 359/630 |
| 2007/0159673 A1 * | 7/2007 | Freeman | G02B 5/1814 |
| | | | 359/19 |
| 2009/0079769 A1 * | 3/2009 | Iisaka | G09G 3/3648 |
| | | | 345/693 |
| 2011/0213664 A1 * | 9/2011 | Osterhout | G02B 27/017 |
| | | | 705/14.58 |
| 2011/0221656 A1 | 9/2011 | Haddick et al. | |
| 2012/0127062 A1 * | 5/2012 | Bar-Zeev | G02B 3/14 |
| | | | 345/6 |
| 2012/0218481 A1 * | 8/2012 | Popovich | G02B 5/1819 |
| | | | 349/11 |
| 2012/0230633 A1 * | 9/2012 | Kusuura | G02B 6/0006 |
| | | | 385/33 |
| 2013/0141937 A1 * | 6/2013 | Katsuta | G02B 6/005 |
| | | | 362/606 |
| 2015/0214886 A1 * | 7/2015 | Wu | C09J 133/00 |
| | | | 428/332 |
| 2016/0097931 A1 * | 4/2016 | Takahota | G02B 27/01 |
| | | | 345/690 |
| 2017/0245746 A1 * | 8/2017 | Komazaki | A61B 1/06 |
| 2018/0128685 A1 * | 5/2018 | Peloux | G06T 7/90 |
| 2018/0372926 A1 * | 12/2018 | Karafin | H04N 13/344 |

\* cited by examiner

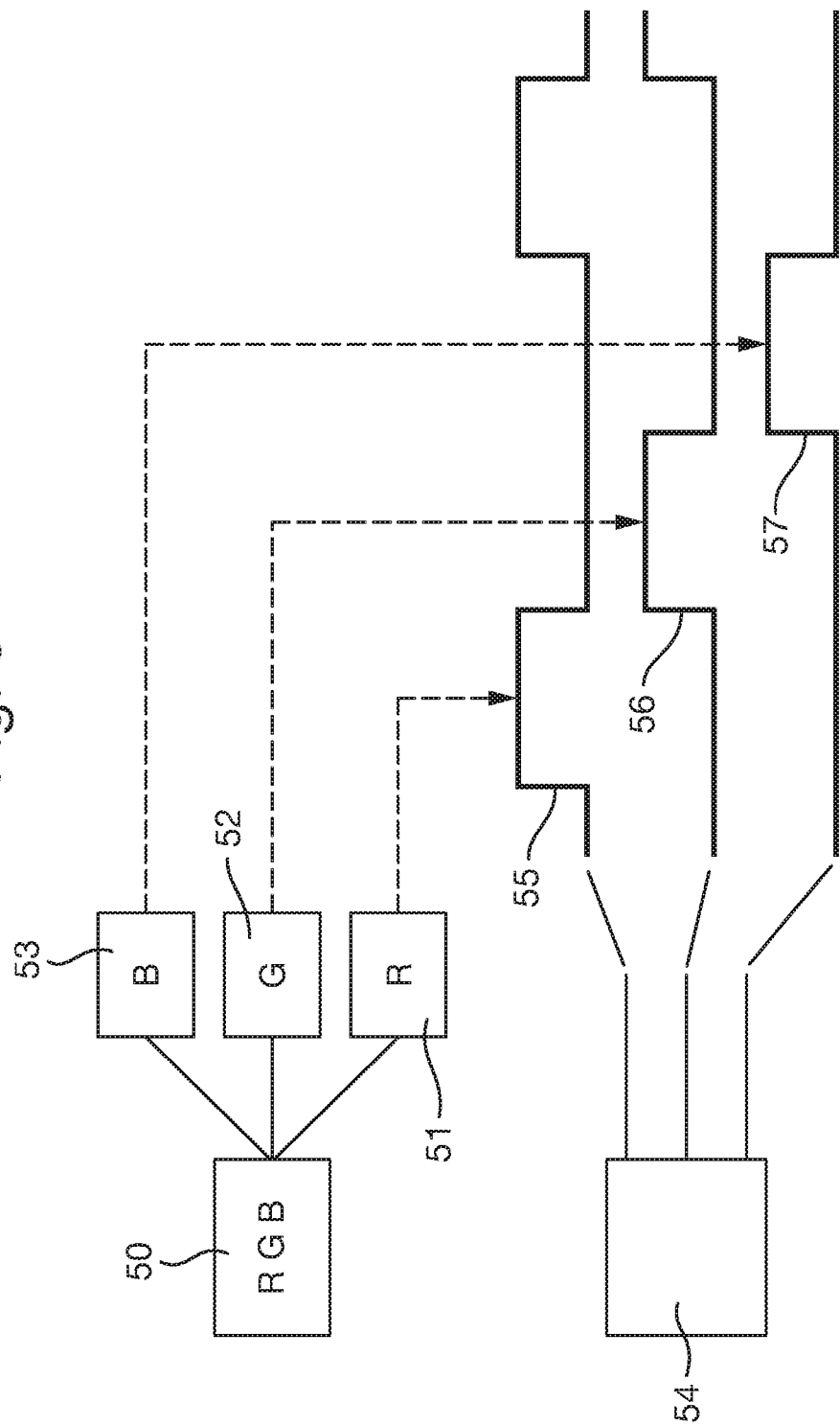

NEAR EYE DISPLAY

Near eye displays are useful in eyewear which can be used to simultaneously view digital information and objects. One way of producing a near eye display is to use a waveguide as disclosed in U.S. Pat. No. 4,711,512. This display uses a diffraction grating to couple light from a display into the waveguide, and another diffraction grating to couple light—following total internal reflection in the waveguide—into the wearer's eye.

The use of diffraction gratings to achieve the input and output coupling can lead to complications with coloured light, since the diffraction gratings are inherently wavelength sensitive. One approach to deal with these complications is to use a number of waveguides each optimised for a different colour, see for examples U.S. Pat. No. 8,885,997.

However, it will be appreciated that the apparatus of U.S. Pat. No. 8,885,997, with multiple waveguides, each individually optimised and with polarisers to prevent unwanted coupling between waveguides, is rather complex and expensive to produce.

According to a first aspect of this invention there is provided a near eye display comprising:
a display device; and
a waveguide;
wherein the waveguide comprises an entry diffractive element and an exit diffractive element;
wherein the display device is arranged to direct light into the waveguide via the entry diffractive element and wherein the exit diffractive element is arranged to direct light from the waveguide towards a user's eye;
wherein the display device is arranged to output images in a repeating sequence of two or more different colours.

There is thus provided an alternative to the rather complicated scheme shown and described in U.S. Pat. No. 8,885,997. This simpler scheme uses a single waveguide instead of using one waveguide per colour, and instead switches the colours of the light source (display device) so that only one colour is passing through the waveguide at any given instant. If this switching is sufficiently rapid, a person viewing such a display will, on account of their persistence of vision, see all the colours simultaneously. Such a novel optical waveguide display will reduce the cost and complexity of this sort of near eye display. By reducing the cost and complexity, such devices can be made available to a larger proportion of the population.

The different colours used for the sequence of images may be essentially monochrome images, e.g. a single wavelength, or they may be a colour band centred on a chosen wavelength.

Although an alternating sequence of two colours may be used and when merged together in the viewer's eye will provide a good range of colours, the display device is preferably arranged to output images in a repeating sequence of three or more colours. As an example, a sequence of three colours may be used such as a sequence of red, green and blue images. When merged together these three colours can normally attain a wide colour gamut that can replicate most of a human eye's detectable colour range. In each cycle of the sequence, these three images are all transmitted down the same waveguide one after the other. Providing the images are transmitted sufficiently rapidly (i.e. in sufficiently quick succession), the brain will not perceive them as separate images, but will instead essentially merge them (as if they were overlaid on top of one another).

Moreover, when multiple wavelengths (especially of significantly different wavelengths) are transmitted simultaneously, the different wavelengths will be diffracted at slightly different angles and will take slightly different paths through the waveguide, which may result in a certain degree of image degradation (e.g. blurring) which the brain cannot compensate for as it cannot resolve all details of all wavelengths. However, sending the images sequentially in time essentially allows the brain to treat the images separately and it can resolve more detail in each individual image. The viewer's persistence of vision will however still allow the brain to merge the images, thus allowing the user to perceive full colour even though it has been received in a time-multiplexed fashion. As the brain is good at pattern recognition, it can compensate for any minor misalignments that occur between the different images. In this way the time-multiplexing approach avoids the need for multiple parallel waveguides for each specific colour or colour band.

Accordingly, it is preferred that the display device be arranged to output images at a frequency (i.e. frame rate) sufficiently high that the two or more images in the repeating sequence are indistinguishable by a user due to the user's persistence of vision. In some preferred examples, the display device may be arranged to output images at a frequency of at least 50 Hz or more preferably at least 55 Hz, more preferably still at least 60 Hz. At 50 Hz, the brain will receive almost 17 frames per second of each of the three colours and thus can see an equivalent frame rate of almost 17 frames per second of full colour. With three colours in the sequence at 60 Hz, the brain receives 20 frames per second of each individual colour and thus an effective full colour frame rate of 20 frames per second can be achieved.

While a sufficiently high frame rate is desired such that the user cannot distinguish the individual single colour frames (i.e. the frame rate must not be so low that the brain does not merge them via persistence of vision), it is also desirable to keep the frame rate low enough that the brain can process each individual frame. For example, if two sequential frames of different colours are transmitted too fast, the image information from both frames may in fact reach the brain's processing centre too fast for the brain to resolve details of the image and they may essentially be treated as one image. If sequential image frames are transmitted too close together, the information may even be merged at photo-receptor level within the eye in which case the brain cannot process the images separately. Accordingly, in some preferred embodiments, the display device may be arranged to output images at a frequency of no more than 300 Hz. In other embodiments the display device may be arranged to output images at a frequency of no more than 200 Hz. In other embodiments the display device may be arranged to output images at a frequency of no more than 150 Hz. The actual limitations on frame rate will depend to some extent on the content being displayed and whether it is highly detailed (frames more easily distinguishable) or with lower detail (such as video with motion blur, where adjacent frames may be less readily distinguishable). The actual frame rates chosen may thus be varied according to content.

The entry and/or exit diffractive elements may be formed by any suitable method. For example they may be formed directly on the surface of the waveguide e.g. using etching or deposition techniques. The diffractive elements may also be of any suitable form, including transmissive gratings and reflective gratings. As the intention is to create a lower cost device, one particularly convenient technique is to form the entry diffractive element and/or the exit diffractive element on a separate element adhered to a surface of the waveguide. For example, the separate element may be a flexible transparent tape. A grating can be printed into an adhesive tape (e.g. a flexible transparent adhesive tape) which is then adhered to a surface of the waveguide. The diffractive element may be adhered to an outside surface of the waveguide (in the case of a transmissive grating) or may be adhered to an internal surface of the waveguide (in the case of a reflective grating).

While a single display and a single waveguide may be used, some of the most popular uses of this invention will be for augmented reality eyewear that will comprise two such devices, one for a left eye and one for a right eye. A single display and lens may certainly be used for monocular devices, e.g. microscopes or telescopes.

Accordingly, the invention extends to eyeglasses comprising:
a lens; and
a near eye display as described above, optionally including any or all of the above-described preferred or optional features;
  wherein the waveguide of the near eye display forms part of the lens.

For example, the lens may be an eyepiece of an optical instrument (e.g. microscope, telescope, etc.) or it may be a lens of a conventional pair of eyeglasses. Such eyeglasses (or spectacles) may comprise two such lenses each with its own waveguide and its own display device (typically controlled by the same controller to coordinate the images for each eye). For normal sighted users, the lenses may be zero-power lenses and are provided simply as a substrate for the waveguide (or indeed as the waveguide itself). However, a large proportion of the world's population require some degree of vision correction and therefore preferably the lenses may be used to apply that correction (including any spherical and/or cylindrical corrections as well as higher order aberration correction if appropriate and desired).

While the traditional corrections of fixed power lenses can in many cases be produced without excessive cost, the invention is particularly beneficial when combined with an adjustable lens, i.e. where the lens is a variable focus lens. There are many known types of variable focus lens such as Alvarez-Lohmann lenses, liquid crystal lenses, etc., and the waveguide may be formed as part of (or attached to) any of these types of lens, but in particularly preferred embodiments the variable focus lens is a fluid filled lens. Such lenses operate by providing a fluid filled cavity with at least one flexible surface so that variation of the volume of fluid in the cavity varies the curvature of the flexible surface and thus the power of the lens.

Thus in certain preferred embodiments, the variable focus lens is a fluid filled lens comprising a fluid filled cavity formed between a front lens element and a rear lens element and the waveguide is formed as part of at least one of the front lens element and the rear lens element. For example the waveguide may be attached to (e.g. adhered to) an outer or inner surface of one of the lens elements or may be formed directly thereon by suitable deposition or etching processes as described above. As one of the front and rear lens elements is flexible in order to permit variation of the power of the lens, the waveguide is preferably formed on the other (rigid) lens element for stability of the optical properties of the waveguide. In a typical arrangement, the display device may be mounted on a leg of a pair of spectacles and thus projects towards the rear element of the spectacle lens. In this arrangement the waveguide is preferably formed on the rear element with the front element being flexible. In order to protect the front lens element, a rigid cover may be provided in front of the front lens element, e.g. to prevent accidental puncture of the flexible membrane.

Such variable focus lenses provide an easy and reliable way for lenses to be adjusted to a required power without going to the expense of fitting custom lenses. Therefore a single product can be used for a large proportion of users, again reducing the cost of the device and increasing the accessibility of augmented reality eyewear.

In other preferred embodiments, the fluid filled lens may itself be the waveguide. By appropriate choice of the refractive indices of the front and rear lens elements and the fluid held therebetween, the fluid filled lens can be designed to cause total internal reflection at certain angles of incidence so that the lens provides the waveguide. The diffractive elements can be attached to (or formed directly on) the front and rear lens elements (either on the external surfaces or internal surfaces) as discussed above.

Due to the variation of curvature of the flexible element of the fluid filled lens (typically a flexible membrane), the waveguide properties may change as the lens power is changed. In order to ensure that the waveguide does not lose the ability to transmit light between the entry diffractive element and the exit diffractive element, one or more further diffractive elements may be formed on the fluid filled lens (preferably on the interior surfaces of the front and/or rear lens elements, and preferably reflective diffractive elements) to ensure continued transmission of light at all lens powers. Further shifts in the output image may occur due to the change of light path at different powers, but the diffractive elements are preferably formed large enough to accommodate these variations.

According to another aspect, the invention provides a method of transmitting an image from a display device comprising:
  the display device outputting images in a repeating sequence of two or more different colours;
  directing said images at an entry diffractive element of a waveguide that guides the images to an exit diffractive element of the waveguide for viewing.

The preferred features described above in relation to the apparatus apply equally to the method and the invention is considered to extend to all such methods.

The provision of a variable focus lens with a waveguide and display device is believed to be independently inventive. Therefore according to a further aspect, there is provided a variable focus lens comprising:
  a waveguide;
  wherein the waveguide comprises an entry diffractive element and an exit diffractive element.

Averaged over all ages, about two thirds of the population have some form of vision correction so as to obtain best acuity, in regions of the world where vision correction is available. There is also a growing number of people who have some form of connectivity to the internet and access to a computer, a smart phone or a similar device. It will be convenient for these people to be able to wear eyeglasses which afford them both a digital display and have provision to correct their uncorrected refractive error.

The variable focus lens described here combines a provision for digital display with a provision for the correction of refractive error in a single structure. At least in preferred embodiments, the lens combines a diffractive beam expander with a variable focus membrane lens, and is sufficiently thin and compact that it can be built into an aesthetically appealing frame which is comfortable to wear. By way of example, a fluid-filled variable focus lens may be used since such lenses are known to give good optical quality. The variable focus lens can take a wide variety of shapes, and the front element of the lens can be formed in such a way as to compensate for aberrations arising from the use of a fluid-filled structure bounded by a membrane. It is of course also possible to use other sorts of variable focus lenses, such as Alvarez-Lohmann lenses, liquid crystal lenses, etc., also with aberration correction as appropriate.

The digital information for the display will be provided by a micro-display (e.g. as described above, although not limited to time-multiplexed systems) which is coupled optically into the entry diffractive element. The digital information for the display may be communicated wirelessly to the micro-display, as too may be the control information to set the correct power of the lens for clear near or distant vision.

Several preferred and optional features of the variable focus lens are set out here.

The variable focus lens may be a fluid filled lens. The fluid filled lens may comprise a front lens element and a rear lens element and a fluid filled cavity formed therebetween, and at least one of the front lens element and the rear lens element is a flexible membrane. The fluid filled lens may additionally comprise a rigid ring between the front and rear lens elements. The ring may comprise a fluid transfer conduit by which fluid may be added to and removed from the lens cavity. A separate fluid reservoir may be provided in communication with the lens through the conduit. A fluid displacement device may be provided to cause fluid to flow into or out from the cavity. For example a pump may be provided for this purpose. The fluid displacement device may be manually controlled, but is preferably electronically controlled to set the power of the lens.

The waveguide may be attached to either the front lens element or the rear lens element. The front lens element or the rear lens element may be the waveguide, i.e. so that light is totally internally reflected within that element and with the diffractive elements formed on (or attached to) that element. The diffractive elements may be formed directly on the lens element, but in some preferred examples, at least one of the entry diffractive element and the exit diffractive element may be formed on a separate substrate and attached to the lens element to form the waveguide. The substrate may be a flexible tape, preferably an adhesive tape. The adhesive tape is preferably a transparent tape.

While the waveguide may be attached to the lens or formed by one of the lens elements as described above, in other preferred embodiments the waveguide is formed by the front lens element and the rear lens element. In such embodiments, the whole lens is used as the waveguide such that it guides light between the two lens elements, within the fluid filled cavity. This is a particularly convenient arrangement.

At least one intermediate reflective element may be formed on an inner surface of either the front lens element or the rear lens element to reflect light as it passes from the entry diffractive element to the exit diffractive element. This intermediate reflective element may be a partially silvered mirror or it may be a further diffractive element for example.

Figure 2:
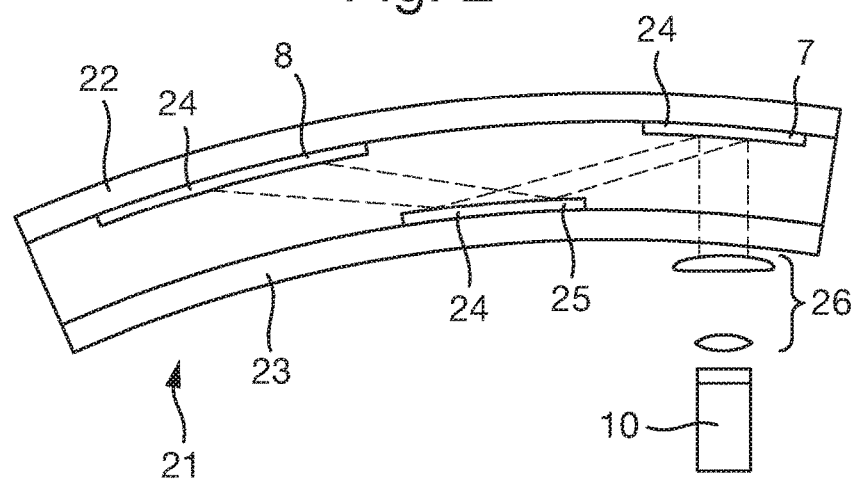
Figure 3:
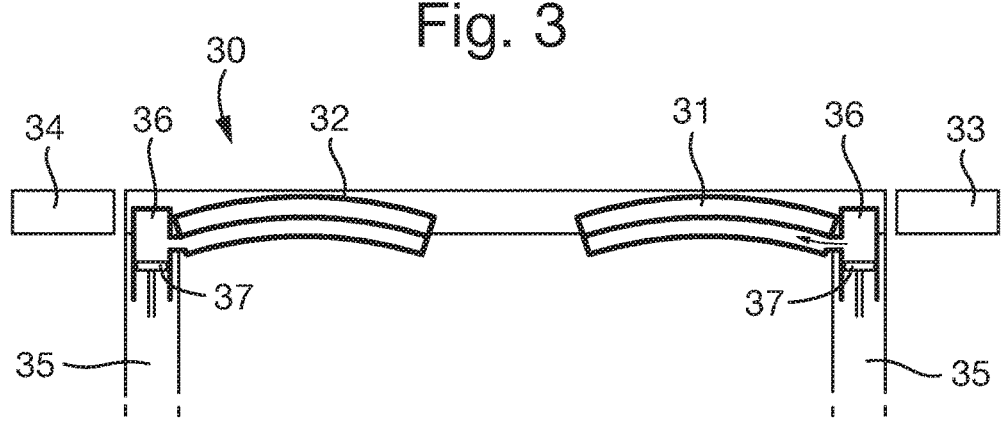
Figure 4:
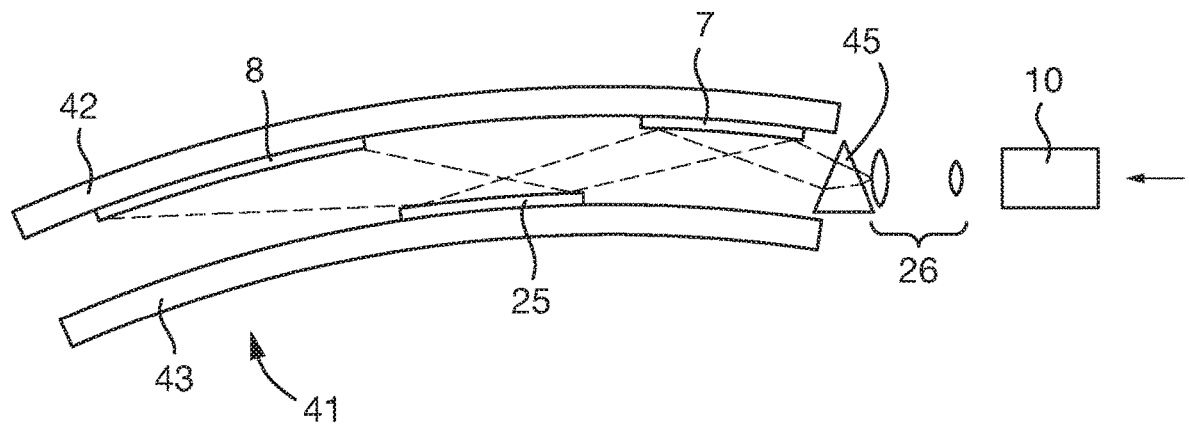

Certain preferred embodiments of the invention will now be described, by way of example only, and with reference to the accompanying drawings in which:

FIG. 1 shows a lens according to a first embodiment;
FIG. 2 shows a lens according to a second embodiment;
FIG. 3 shows a pair of spectacles having two lenses;
FIG. 4 shows a lens according to a third embodiment; and
FIG. 5 shows the time-multiplexing approach for RGB images.

FIG. 1 shows a variable focus lens 1. The variable focus lens 1 is formed from a front lens element 2, an intermediate ring 3 and a rear lens element 4. The front element 2 is a transparent rigid plastic plate which may be a corrective lens or may have zero power. The intermediate ring 3 is an annular plastic spacer that separates the front element 2 from the rear element 4 and forms the fluid cavity 5 therebetween. The rear element 4 is a transparent flexible membrane that can deform according to the amount of fluid within cavity 5 so as to change the power of the lens 1. Fluid may be added to or removed from the cavity 5 via conduit 6 via any suitable fluid displacement device, e.g. a pump or a syringe for example.

The front lens element 1 is formed as a waveguide and has an entry diffractive element 7 formed at the bottom of the rear surface thereof (i.e. on the inside of the lens, adjacent to the fluid cavity 5) and an exit diffractive element 8 formed at the top of the rear surface thereof.

A micro-display 10 is located near to the entry diffractive element together with a lens 11 for directing light onto the entry diffractive element 7 in such a way as to cause the light to totally internally reflect within the waveguide (lens element 2) and arrive at exit diffractive element 8. It will be appreciated that any number of different positions of the micro-display 10 may be considered, with appropriate optics 11 chosen in each case, but purely by way of example two options for position are shown at $D_1$ and $D_2$.

FIG. 2 shows a variable focus lens 21 having a front lens element 22 and rear lens element 23 with fluid in between. The lens construction may be similar to that described above in relation to FIG. 1, but in this embodiment the lens itself is used to form the waveguide. The entry diffractive element 7 and exit diffractive element 8 are provided on the inside surface of the front lens element 22. In this embodiment the entry and exit diffractive elements 7, 8 are each formed on a separate substrate 24 which in this example is a flexible transparent adhesive tape which is then adhered to the front lens element 22. The diffractive elements may be formed on the tape 24 in any suitable manner. In one example the diffractive elements 7, 8 may be printed onto substrate 24.

A further, intermediate element 25 is also provided on the inside surface of the rear lens element 23. The intermediate element 25 is a reflective element such as a reflective diffractive element (although it could also be a partially reflective mirror). Because the curvature of one of the lens elements 22, 23 may be varied in order to vary the power of the lens 21, the intermediate element 25 ensures that internal reflection occurs within the waveguide at all powers of the lens 21.

Micro-display 10 is directed at entry diffractive element 7 via matching optics 26 (used e.g. to match the beam width and divergence of the display 10 to the diffractive element 7).

FIG. 3 illustrates a bottom view of a pair of eyeglasses 30 having two lenses of the type shown in FIG. 2 (although the lenses of FIG. 1 or 4 may equally be used). A left eye lens 31 and a right eye lens 32 are provided. A left eye micro-display 33 and a right eye micro-display 34 are also provided for the respective lenses. These are wirelessly controlled and receive image data wirelessly (although it will be appreciated that other forms of control are possible, e.g. using a local controller and data stored locally). Eyeglasses 30 have legs 35 (although these are not obligatory). Legs 35 in this example conveniently include a fluid reservoir 36 and fluid displacement device 37 for each lens 31, 32.

FIG. 4 shows a third embodiment of a fluid filled lens 41, similar in construction to the lens 21 of FIG. 3. The variable focus lens 41 has front lens element 42, rear lens element 43 (at least one of which is flexible) with fluid between them. Lens 41 also has entry diffractive element 7, exit diffractive element 8 and intermediate reflective element 25 similarly to lens 21 of FIG. 3. However the lens 41 of FIG. 4 has the micro-display 10 and matching optics 26 located to the side of the lens 41 and uses a prism 45 to redirect light onto the entry diffractive element 7.

FIG. 5 illustrates how the images displayed by micro-display 10 (or micro-displays 33 and 34) transmit images of a single colour (or a narrow band of wavelengths, i.e. a colour band) in sequence through the same waveguide.

A full colour frame 50 can be divided into a number of different colours. In this example, the traditional RGB model is used, although it will be appreciated that the invention can be used with as few as two colours and can be used with four or more if desired. A full colour frame 50 is divided into three monochrome frames; a red frame 51, a green frame 52 and a blue frame 53.

A frame scheduler 54 outputs three signals, one for each of the colours, i.e. a red signal 55, a green signal 56 and a blue signal 57 which are used to time the output of the individual colour frames at the micro-display 10. As illustrated, the frame scheduler 54 interleaves the signals 55, 56, 57 so that only one individual colour frame is displayed at once and thus only a single colour is passed through the waveguide at once. By ensuring that only a single colour passes through the waveguide at once, and only a single colour is displayed to the eye and brain at once, the optical degradation such as blurring of having multiple colours (multiple wavelengths) transmitted through the same waveguide at once is avoided. The eye and brain can resolve each monochrome image at a high level of detail as it is displayed, while the brain's persistence of vision compensates for the separation in time of the different colours, adjusting for minor spatial shifts and merging the colours back together so that the user "sees" the full colour image as it as originally intended.

In some examples the frame scheduler 54 is arranged to send frames at a rate of at least 50 frames per second and in two particularly preferred arrangements operates at or around 60 frames per second or 75 frames per second. This is the total number of frames of all colours, such that each monochrome frame is sent at a fraction of this total frame rate. For example at 60 fps, the frame scheduler 54 sends 20 red frames, 20 green frames and 20 blue frames per second. At 75 fps, the frame scheduler 54 sends 25 frames of each. At these frame rates, the eye and brain can process each individual monochrome frame for the purposes of extracting detail and merging the frames, but the frame rate is sufficiently fast that the user will effectively experience full colour at one third of the frame rate, i.e. essentially 20 or 25 frames per second of full colour in these most preferred examples.

This technique avoids the complex and expensive multiple-waveguide schemes that have been used to address the problem previously.

The invention claimed is:

1. Eyeglasses comprising:
a variable focus fluid filled lens; and
a near eye display;
wherein the variable focus fluid filled lens comprises a fluid filled cavity formed between a front lens element and a rear lens element;
wherein the near eye display comprises:
a display device; and
a waveguide;
wherein the waveguide comprises an entry diffractive element and an exit diffractive element;
wherein the front lens element forms the waveguide,
wherein the fluid is disposed between the waveguide and the rear lens element of the variable focus fluid filled lens;
wherein the display device is arranged to direct light into the waveguide via the entry diffractive element and wherein the exit diffractive element is arranged to direct light from the waveguide towards a user's eye;
wherein the display device is arranged to output images in a repeating sequence of two or more different colours.

2. A near eye display as claimed in claim 1, wherein the display device is arranged to output images in a repeating sequence of three or more colours.

3. A near eye display as claimed in claim 1, wherein the display device is arranged to output images at a frequency sufficiently high that the two or more images in the repeating sequence are indistinguishable by a user due to the user's persistence of vision.

4. A near eye display as claimed in claim 1, wherein the display device is arranged to output images at a frequency of at least 50 Hz.

5. A near eye display as claimed in claim 4, wherein the display device is arranged to output images at a frequency of at least 60 Hz.

6. A near eye display as claimed in claim 1, wherein the display device is arranged to output images at a frequency of no more than 300 Hz.

7. A near eye display as claimed in claim 1, wherein the display device is arranged to output images at a frequency of no more than 200 Hz.

8. A near eye display as claimed in claim 1, wherein at least one of the entry diffractive element and the exit diffractive element is formed in a separate element adhered to an inside surface of the waveguide.

9. A near eye display as claimed in claim 8, wherein the separate element is a flexible transparent tape.

* * * * *